US011183707B2

(12) United States Patent
Zeng et al.

(10) Patent No.: US 11,183,707 B2
(45) Date of Patent: Nov. 23, 2021

(54) ANODE MATERIAL, METHOD FOR MAKING THE SAME, AND LITHIUM-ION BATTERY

(71) Applicant: XTC New Energy Materials(Xiamen) LTD., Xiamen (CN)

(72) Inventors: Lei-Ying Zeng, Xiamen (CN); Jian Zhang, Xiamen (CN); Ze-Yu Yan, Xiamen (CN)

(73) Assignee: XTC New Energy Materials(Xiamen) LTD., Xiamen (CN)

( * ) Notice: Subject to any disclaimer, the term of this patent is extended or adjusted under 35 U.S.C. 154(b) by 136 days.

(21) Appl. No.: 16/507,305

(22) Filed: Jul. 10, 2019

(65) Prior Publication Data

US 2019/0334198 A1   Oct. 31, 2019

Related U.S. Application Data

(63) Continuation of application No. PCT/CN2017/113630, filed on Nov. 29, 2017.

(51) Int. Cl.
| | |
|---|---|
| *H01M 10/0525* | (2010.01) |
| *H01M 4/04* | (2006.01) |
| *H01M 4/131* | (2010.01) |
| *H01M 4/36* | (2006.01) |
| *H01M 4/505* | (2010.01) |
| *H01M 4/525* | (2010.01) |
| *H01M 4/02* | (2006.01) |

(52) U.S. Cl.
CPC ..... *H01M 10/0525* (2013.01); *H01M 4/0471* (2013.01); *H01M 4/131* (2013.01); *H01M 4/366* (2013.01); *H01M 4/505* (2013.01); *H01M 4/525* (2013.01); *H01M 2004/028* (2013.01)

(58) Field of Classification Search
CPC ....... H01M 4/366; H01M 4/463; H01M 4/525
See application file for complete search history.

(56) References Cited

U.S. PATENT DOCUMENTS

| | | | | |
|---|---|---|---|---|
| 9,123,939 B2 * | 9/2015 | Xiao | ...................... | H01M 4/049 |
| 10,665,859 B2 * | 5/2020 | Park | .................. | H01M 10/4235 |

(Continued)

FOREIGN PATENT DOCUMENTS

| | | |
|---|---|---|
| CN | 102394295 B | 9/2015 |
| CN | 103137961 B | 8/2016 |

(Continued)

OTHER PUBLICATIONS

Translation of written opinion (no date).*

*Primary Examiner* — Amanda C. Walke
(74) *Attorney, Agent, or Firm* — ScienBiziP, P.C.

(57) ABSTRACT

An anode material used for a lithium-ion battery utilizing a greater part of the storage capacity includes particles in outer dense layer, then inner layer, and then particle core. The outer dense layer is evenly enriched with an M element and an A element, the enrichment decreasing from the outside towards the core. The particle core does include the M element and the A element at a concentration greater than zero and having an average distribution. The M element includes Al, or Al and at least one of Mg, Ti, Zr, Mn. The A element includes F, or F and at least one of B, P, and N. A method for manufacturing the anode material and a lithium-ion battery are also disclosed.

12 Claims, 9 Drawing Sheets

(56) References Cited

U.S. PATENT DOCUMENTS

| | | | |
|---|---|---|---|
| 2015/0380722 A1* | 12/2015 | Blangero | H01M 4/525 |
| | | | 429/231.3 |
| 2016/0260966 A1* | 9/2016 | Ohsawa | H01M 4/625 |
| 2016/0351973 A1* | 12/2016 | Albano | H01M 4/13 |
| 2016/0359165 A1* | 12/2016 | Kim | H01M 10/0525 |
| 2017/0092932 A1* | 3/2017 | Kim | H01M 4/523 |
| 2017/0117535 A1* | 4/2017 | Yoon | H01M 4/1395 |
| 2017/0222221 A1* | 8/2017 | Park | C01G 53/42 |
| 2018/0019464 A1* | 1/2018 | Xia | H01M 4/62 |
| 2018/0123186 A1 | 5/2018 | Kim et al. | |
| 2018/0190976 A1* | 7/2018 | Blangero | H01M 4/366 |
| 2019/0359497 A1* | 11/2019 | Ma | C01G 53/006 |
| 2019/0379044 A1* | 12/2019 | Yun | C01G 53/006 |
| 2019/0393502 A1* | 12/2019 | Yun | H01M 4/505 |
| 2020/0119351 A1* | 4/2020 | Yun | H01M 4/525 |

FOREIGN PATENT DOCUMENTS

| | | |
|---|---|---|
| CN | 107078356 A | 8/2017 |
| CN | 107210422 A | 9/2017 |
| KR | 10-2015-0092258 | 8/2015 |
| KR | 10-2017-0118091 | 10/2017 |
| WO | 2016116862 A1 | 7/2016 |

\* cited by examiner

ANODE MATERIAL, METHOD FOR MAKING THE SAME, AND LITHIUM-ION BATTERY

CROSS-REFERENCE TO RELATED APPLICATIONS

This application is a continuation under 35 U.S.C. § 120 of international patent application PCT/CN2017/113630 filed Nov. 29, 2017.

FIELD

The disclosure relates to batteries, and more particularly to lithium-ion batteries.

BACKGROUND

Lithium-ion batteries have high operation voltage, high energy density, long cycling life, light weight, low self-discharge, extremely small memory effect, and high cost performance. The lithium-ion batteries are widely used in various fields including portable devices and electric vehicles, and are becoming the most competitive power batteries. The anode material plays a key role in the performance of the lithium-ion battery, which determines the performance of the lithium-ion battery. However, the anode material can also become a bottleneck which limits the energy density, the power density, the cycling life, the safety of the lithium-ion battery. Thus, it is a hotspot for one ordinary skill in the art to improve the performance of the anode material.

Most commercial lithium cobalt oxide anode material has a low capacity of about 140 mAh/g. Although the lithium cobalt oxide anode material can have a theoretical capacity of about 274 mAh/g, a voltage greater than 4.5V is necessary to utilize such capacity. A high voltage may cause an irreversible damage to the structure of the lithium-ion battery and cause serious side reactions, which also decrease the cycling stability, the rate capability, and the thermal stability of the lithium-ion battery.

Thus, there is room for improvement within the art.

SUMMARY

In view of the above, an objective of the present disclosure is to provide an anode material for a lithium-ion battery that can have structural stabilities and high energy density under a high voltage, a method for making the anode material, and a lithium-ion battery having the anode material.

According to an embodiment, the present disclosure provides an anode material adapted for a lithium-ion battery, including a plurality of particles, each of the plurality of particles comprising an outer dense layer, an inner layer, and a particle core, the inner layer being between the outer dense layer and the particle core. Wherein the outer dense layer is evenly enriched with an M element and an A element. The inner layer comprises the M element and the A element, concentrations of the M element and the A element progressively decreasing in the inner layer along a direction from the outer dense layer to the particle core. The particle core comprises the M element and the A element, concentrations of the M element and the A element being greater than zero and evenly distributed in the particle core. The M element includes one or more metallic elements having doping and coating functions. The A element includes one or more nonmetallic elements having doping and coating functions. The M element comprises Al, or Al and at least one of Mg, Ti, Zr, Mn, and Ni, and the A element comprises F, or F and at least one of B, P, and N.

The present disclosure further provides an anode material adapted for a lithium-ion battery, including a plurality of particles, each of the plurality of particles having an outer dense layer, an inner layer, and a particle core, the inner layer being between the outer dense layer and the particle core. Wherein the outer dense layer is enriched with an M element and an A element, concentrations of the M element and the A element being progressively decreasing in the outer dense layer and in the inner layer along a direction from the outer dense layer to the particle core. The particle core comprises the M element and the A element, concentrations of the M element and the A element being greater than zero and being evenly distributed in the particle core. The plurality of particles of the anode material have a uniform particle size or non-uniform particle sizes, when the plurality of particles have non-uniform particle sizes, a concentration of the M element in the outer dense layer of small particles is higher than that in the outer dense layer of the large particles. The M element includes one or more metallic elements having doping and coating functions. The A element includes one or more nonmetallic elements having doping and coating functions. The M element comprises Al, or Al and at least one of Mg, Ti, Zr, Mn, and Ni, the A element comprises F, or F and at least one of B, P, and N.

The present disclosure further provides a method for making an anode material for a lithium-ion battery, including:

mixing a cobalt compound and a lithium compound to form a primary mixture, a mole ratio between the lithium element and the cobalt element in the primary mixture being between 1 and 1.06, the cobalt compound having a medium diameter of 13 microns to 16 microns, wherein the cobalt compound can be doped with an M' element, the M' element comprises Al, or Al and at least one of Mg, Ti, Zr, Mn, and Ni, a nano-scale additive comprising an M" element can be added into the primary mixture, the M" element comprises Al, or Al and at least one of Mg, Ti, Zr, Mn, and Ni; forming primary sintered particles by sintering the primary mixture with a first sintering process and a second sintering process, the first sintering process comprising heating the primary mixture to a first temperature ranging from 700 degrees Celsius to 900 degrees Celsius, and sintering the primary mixture at the first temperature for a first time period $H_1$, the second sintering process comprising heating the primary mixture to a second temperature ranging from 900 degrees Celsius to 1100 degrees Celsius, and sintering the primary mixture at the second temperature for a second time period $H_2$, a sum of the first time period $H_1$ and the second time period $H_2$ being 8 hours to 20 hours;

crushing and separating the primary sintered particles into intermediate particles having non-uniform particle sizes;

mixing the intermediate particles having non-uniform particle sizes, a nano-scale additive comprising an M element, and a nano-scale additive comprising an A element to form a secondary mixture, wherein the M element comprises Al, or Al and at least one of Mg, Ti, Zr, Mn, and Ni; the A element comprises F, or F and at least one of B, P, and N;

forming secondary sintered particles by sintering the secondary mixture at a third temperature from 600 degrees Celsius to 1100 degrees Celsius for a third time period $H_3$ from 5 hours to 20 hours; and cooling and milling the secondary sintered particles to form the anode material.

The present disclosure further provides a lithium-ion battery including an electrode plate, a lithium plate, and an electrolyte. The electrode plate includes the above anode material, a binding agent, and an electrical conductive agent. The lithium-ion battery has a capacity retention ratio greater than 80% after 50 cycles under a voltage of 4.6 V.

The anode material of the present disclosure has an excellent electrochemical performance through surface modification. The anode material has a higher specific capacity and also a more stable structure by coating positive and negative ions on the surface. Thus, it can overcome the shortcomings of the existing anode material, especially the lithium cobaltate anode material, in capacity and stabilities.

BRIEF DESCRIPTION OF THE DRAWINGS

Implementations of the disclosure will now be described, by way of embodiments only, with reference to the attached figures.

DETAILED DESCRIPTION

Figure 1:
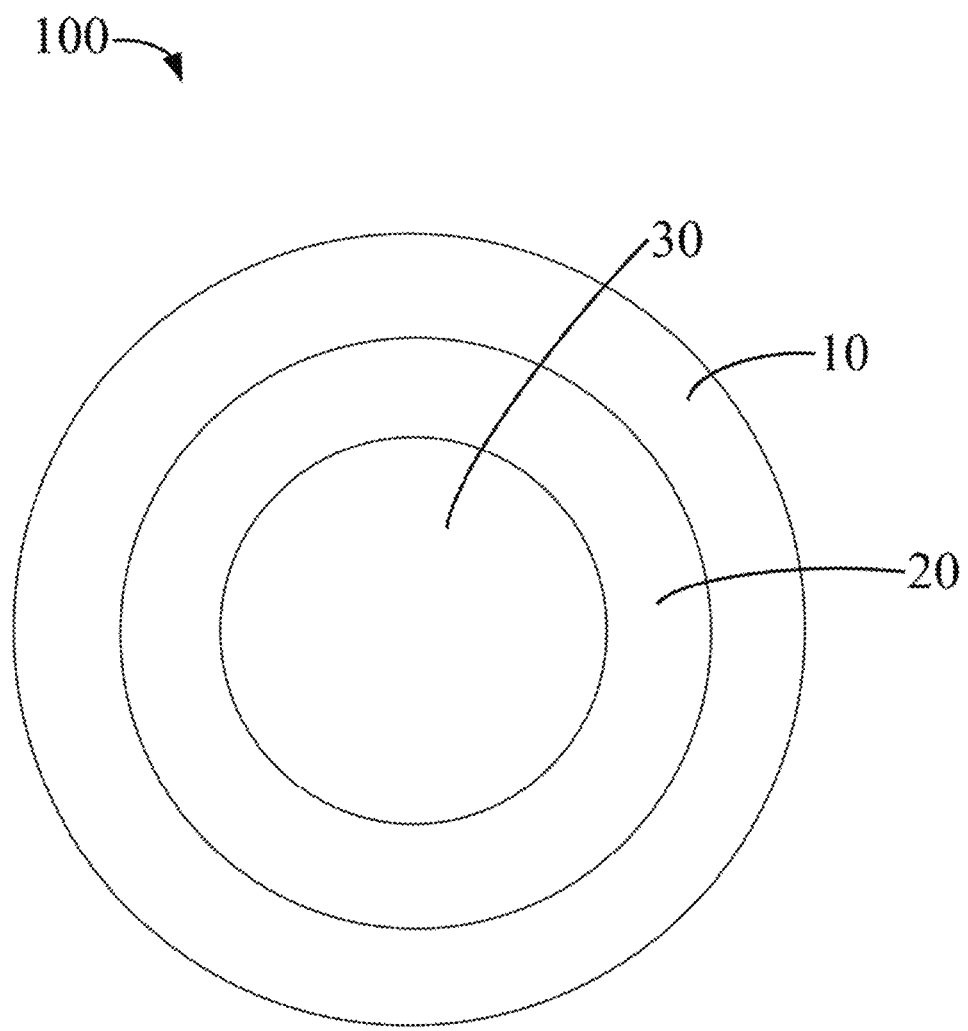
FIG. 1 is a diagrammatic view of an embodiment of an anode material for lithium-ion battery of the present disclosure.

It will be appreciated that for simplicity and clarity of illustration, where appropriate, reference numerals have been repeated among the different figures to indicate corresponding or analogous components. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 illustrates an embodiment of an anode material used for a lithium-ion battery. The anode material includes a plurality of particles 100 each having an outer dense layer 10, an inner layer 20, and a particle core 30. The inner layer 20 is positioned between the outer dense layer 10 and the particle core 30. The outer dense layer 10 is evenly enriched with an M element and an A element. The inner layer 20 includes the M element and the A element, and concentrations of the M element and the A element progressively decreasing in the inner layer 20 along a direction from the outer dense layer 10 to the particle core 30. The particle core 30 includes the M element and the A element, and concentrations of the M element and the A element being greater than zero and evenly distributed in the particle core 30. The M element includes one or more metallic elements having doping and coating functions. The A element includes one or more nonmetallic elements having doping and coating functions.

The M element includes aluminum (Al), or Al and at least one of magnesium (Mg), titanium (Ti), zirconium (Zr), manganese (Mn), and nickel (Ni). That is, when the M element includes only one element, the M element is Al. When the M element includes Al and other metallic element(s), the other metallic element(s) can be at least one of Mg, Ti, Zr, Mn, and Ni.

The A element includes fluorine (F), or F and at least one of boron (B), phosphor (P), and nitrogen (N). That is, when the A element includes only one element, the A element is F. When the A element includes F and other nonmetallic element(s), the other nonmetallic element(s) can be at least one of B, P, and N.

In an embodiment, the anode material has a general formula of $Li_{1+z}Co_{1-x}MxO_mA_n$. Wherein, $0<z\le0.05$, $0<x\le0.03$, $1.9\le m+n\le2.1$, m and n are not zero.

In an embodiment, the particles 100 of the anode material have a uniform particle size or non-uniform particle sizes. When the particles 100 of the anode material have non-uniform particle sizes (that is, small particles and large particles), a concentration of the M element in the outer dense layer 10 of the small particles is higher than that in the outer dense layer 10 of the large particles. In an embodiment, the small particles have a medium diameter of 2 microns to 8 microns. The large particles have a medium diameter of 13 microns to 22 microns.

In an embodiment, when the M element is Al, the M element has a concentration of 500 ppm to 12000 ppm. When the A element is F, the A element has a concentration of 200 ppm to 2000 ppm.

In another embodiment, when the M element includes Al and at least one of Mg, Ti, Zr, Mn, and Ni, Al has a concentration of 500 ppm to 12000 ppm, and the M element has a total concentration of 1000 ppm to 30000 ppm. When the A element includes F and at least one of B, P, and N, F has a concentration of 200 ppm to 2000 ppm, and the A element has a total concentration of 200 ppm to 4000 ppm.

In another embodiment, the outer dense layer 10 is enriched with M element and A element. The concentrations of the M element and the A element progressively decrease in the outer dense layer 10 and the inner layer 20 along a direction from the outer dense layer 10 to the particle core 30. The particle core 30 includes the M element and the A element, and the concentrations of the M element and the A element being greater than zero and evenly distributed in the particle core 30. The M element includes one or more metallic elements having functions of doping and coating. The A element includes one or more nonmetallic elements having functions of doping and coating. Particle sizes of the particles 100 of the anode material may be uniform or non-uniform. When the anode material comprises the particle 100 having non-uniform particle sizes (that is, including small particles and large particles), the concentration of the M element of the small particles is higher than that of the large particles.

The M element includes Al, or Al and at least one of Mg, Ti, Zr, Mn, and Ni. That is, when the M element includes only one element, the M element is Al. When the M element includes Al and other metallic element(s), the other metallic element(s) can be at least one of Mg, Ti, Zr, Mn, and Ni.

The A element includes F, or F and at least one of B, P, and N. That is, when the A element includes only one element, the A element is F. When the A element includes F and other nonmetallic element(s), the other nonmetallic element(s) can be at least one of B, P, and N.

In this embodiment, the anode material has a general formula of $Li_{1+z}Co_{1-x}MxO_mA_n$. Wherein, $0<z\leq0.05$, $0<x\leq0.03$, $1.9\leq m+n\leq2.1$, m and n are not zero.

In this embodiment, the large particles and the small particles are in a ratio between 7:3 and 9:1 by weight.

In this embodiment, when the M element is Al, the M element has a concentration of 500 ppm to 12000 ppm. When the A element is F, the A element has a concentration of 200 ppm to 2000 ppm.

Furthermore, when the M element includes Al and at least one of Mg, Ti, Zr, Mn, and Ni, Al has a concentration of 500 ppm to 12000 ppm, and the M element has a total concentration of 1000 ppm to 30000 ppm. When the A element includes F and at least one of B, P, and N, F has a concentration of 200 ppm to 2000 ppm, and the A element has a total concentration of 200 ppm to 4000 ppm.

In an embodiment, the particles 100 of the anode material include primary particles and secondary particles formed by the primary particles.

Based on EPMA result of the anode material, the concentrations of the metallic ions M (also positive ions) and the nonmetallic ions A (also positive ions) progressively decrease in the inner layer 20 or both in the outer dense layer 10 and the inner layer 20. The formation of the outer dense layer 10 has a close relationship with the coating and doping of the metallic ions M and the nonmetallic ions A to the anode material.

Figure 2:
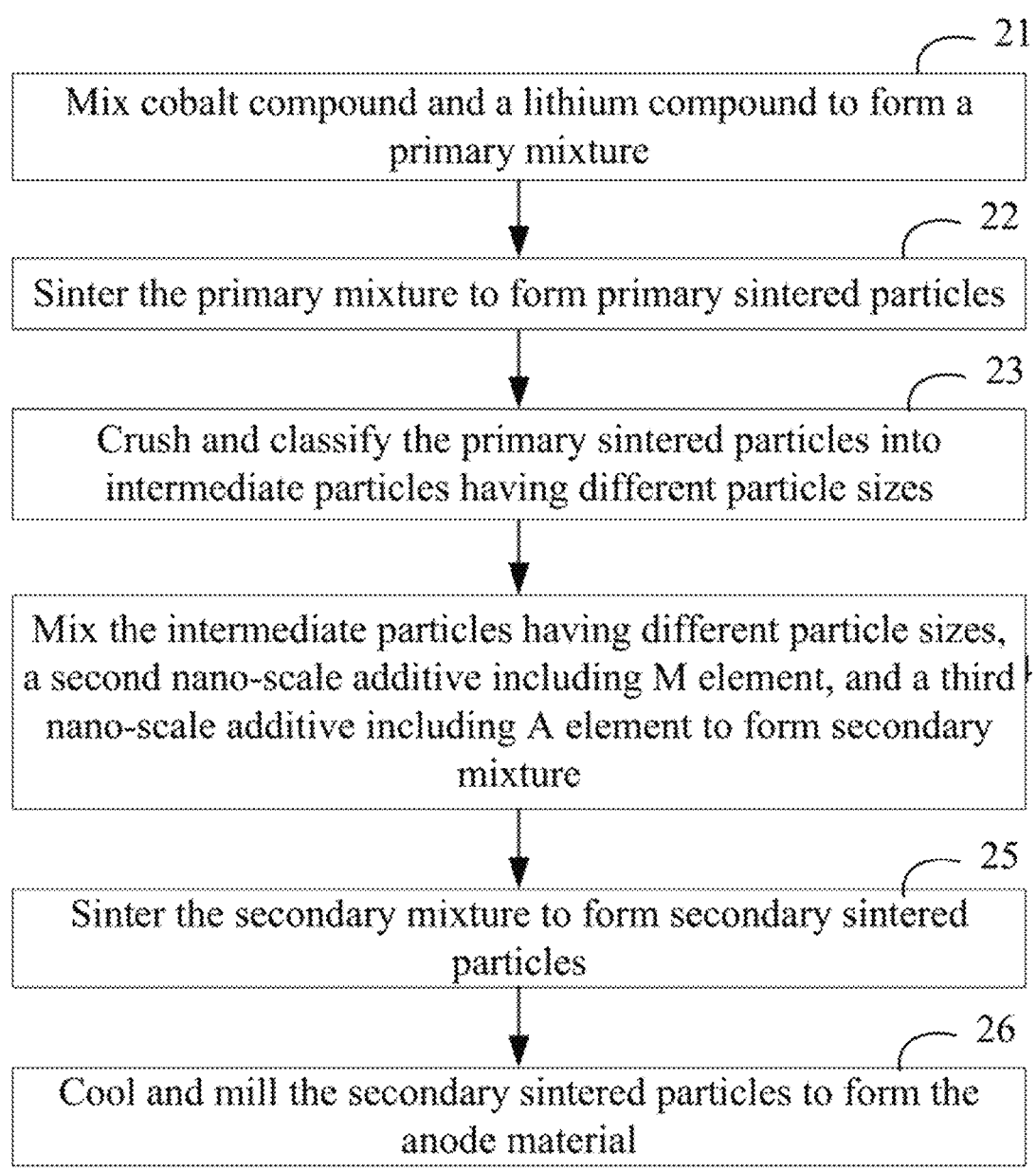
FIG. 2 is a flowchart of an embodiment of a method for making an anode material for lithium-ion battery of the present disclosure.

FIG. 2 illustrates an embodiment of a method for making the anode material for the lithium-ion battery. The method can begin at step S1.

At S1, a cobalt compound and a lithium compound are mixed to form a primary mixture (primary mixing step). The lithium element and the cobalt element (Li/Co) in the primary mixture are in a mole ratio between 1:1 and 1.06:1. The cobalt compound has a medium diameter (D50) of 13 microns to 16 microns.

In another embodiment, the cobalt compound can be doped with an M' element. The M' element includes Al, or Al and at least one of Mg, Ti, Zr, Mn, and Ni. Furthermore, a first nano-scale additive including an M" element can further be added into the primary mixture. The M" element includes Al, or Al and at least one of Mg, Ti, Zr, Mn, and Ni. The first nano-scale additive includes at least one of oxide, fluoride, and carbonic acid compound including the M" element.

At S2, the primary mixture is sintered to form primary sintered particles (primary sintering step). The primary mixture is sintered by a first and second sintering processes. The first sintering process includes heating the primary mixture to a first temperature ranging from 700 degrees Celsius to 900 degrees Celsius, and sintering the primary mixture at the first temperature for a first time period $H_1$. The second sintering process includes heating the primary mixture from the first temperature to a second temperature ranging from 900 degrees Celsius to 1100 degrees Celsius, and sintering the primary mixture at the second temperature for a second time period $H_2$. A sum of the first time period $H_1$ and the second time period $H_2$ is 8 hours to 20 hours.

At S3, the primary sintered particles are crushed and separated (crushing and separating step) into intermediate particles having non-uniform particle sizes.

At S4, the intermediate particles having non-uniform particle sizes, a second nano-scale additive including an M element, and a third nano-scale additive including an A element are mixed to form secondary mixture (secondary mixing step). The M element includes Al, or Al and at least one of Mg, Ti, Zr, Mn, and Ni. The A element includes F, or F and at least one of B, P, and N.

At S5, the secondary mixture is sintered at a third temperature from 600 degrees Celsius to 1100 degrees Celsius for a third time period $H_3$ from 5 hours to 20 hours, to form secondary sintered particles (secondary sintering step).

At S6, the secondary sintered particles are cooled and milled (milling step) to form the anode material.

In an embodiment, during the primary mixing, the amounts of the cobalt compound, the lithium compound, and the first nano-scale additive causes the anode material to have a general formula of $Li_{1+z}Co_{1-x}MxO_mA_n$. Wherein, $0<z\leq0.05$, $0<x\leq0.03$, $1.9\leq m+n\leq2.1$, m and n are not zero.

In an embodiment, during the secondary mixing, the amounts of the large intermediate particles, the small intermediate particles, the second nano-scale additive, and the third nano-scale additive causes the anode material to have a general formula of $Li_{1+z}Co_{1-x}MxO_mA_n$. Wherein, $0<z\leq0.05$, $0<x\leq0.03$, $1.9\leq m+n\leq2.1$, m and n are not zero.

In an embodiment, the cobalt compound includes cobaltosic oxide. The lithium compound includes lithium carbonate.

In an embodiment, the third nano-scale additive includes at least one of LiF, $AlF_3$, and $MgF_2$.

In an embodiment, the intermediate particles having non-uniform particle sizes are separated into large intermediate particles and small intermediate particles. The small intermediate particles have a medium diameter of 2 microns to 8 microns. The large intermediate particles have a medium diameter of 13 microns to 22 microns.

In an embodiment, during the secondary mixing, the large intermediate particles and the small intermediate particles are in a ratio between 7:3 and 9:1 by weight.

In this embodiment, the method is implemented to making the lithium-ion battery. The method includes following steps.

1. Lithium Cobaltate Large Intermediate Particles Making.

The cobaltosic oxide and the lithium compound are mixed to form the primary mixture. In an embodiment, the cobaltosic oxide can be doped with the M' element. The M' element includes Al, or Al and at least one of Mg, Ti, Zr, Mn, and Ni. Furthermore, the first nano-scale additive including an M" element can further be added into the primary mixture. The M" element includes Al, or Al and at least one of Mg, Ti, Zr, Mn, and Ni. The M' element and the M" element can be selected from the M element.

The primary mixture is sintered to form the primary sintered particles. The primary mixture is sintered by a first and a second sintering processes. The first sintering process includes heating the primary mixture to a first temperature ranging from 700 degrees Celsius to 900 degrees Celsius, and sintering the primary mixture at the first temperature for a first time period $H_1$. The second sintering process includes heating the primary mixture from the first temperature to a second temperature ranging from 900 degrees Celsius to 1100 degrees Celsius, and sintering the primary mixture at the second temperature for a second time period $H_2$. A sum of the first time period $H_1$ and the second time period $H_2$ is 8 hours to 20 hours. The primary sintered particles are crushed and separated to obtain the lithium cobaltate large intermediate particles. In an embodiment, the lithium cobaltate large intermediate particles have a medium diameter (D50) of 13 microns to 22 microns. The lithium cobaltate large intermediate particles include primary particles and secondary particles formed by the primary particles.

2. Lithium Cobaltate Small Intermediate Particles Making.

The cobaltosic oxide and the lithium compound are mixed to form the primary mixture. In an embodiment, the cobaltosic oxide can be doped with the M' element. Furthermore, the first nano-scale additive including an M" element can further be added into the primary mixture.

The primary mixture is sintered to form primary sintered particles. The primary mixture is sintered by a first and a second sintering process. The first sintering process includes heating the primary mixture to a first temperature ranging from 700 degrees Celsius to 900 degrees Celsius, and sintering the primary mixture at the first temperature for a first time period $H_1$. The second sintering process includes heating the primary mixture from the first temperature to a second temperature ranging from 900 degrees Celsius to 1000 degrees Celsius, and sintering the primary mixture at the second temperature for a second time period $H_2$. A sum of the first time period $H_1$ and the second time period $H_2$ is 8 hours to 20 hours. The second primary sintered particles are crushed and separated to obtain the lithium cobaltate small intermediate particles. In an embodiment, the lithium cobaltate small intermediate particles have a medium diameter of 2 microns to 8 microns. The lithium cobaltate small intermediate particles include primary particles and secondary particles formed by the primary particles.

3. Anode Material Making.

The second nano-scale additive including an M element, the third nano-scale additive including an A element, and at least one of the lithium cobaltate small intermediate particles and the lithium cobaltate small intermediate particles, are mixed to form the secondary mixture. The second nano-scale additive includes at least one of oxide, fluoride, and carbonic acid compound including the M element. The M element includes Al, or Al and at least one of Mg, Ti, Zr, Mn, and Ni. When the M element is Al, the M element has a concentration of 500 ppm to 12000 ppm. When the M element includes Al and at least one of Mg, Ti, Zr, Mn, and Ni, Al has a concentration of 500 ppm to 12000 ppm, and the M element has a total concentration of 1000 ppm to 30000 ppm.

The third nano-scale additive including the A element includes at least one of oxide, fluoride, and carbonic acid compound. The A element includes F, or F and at least one of B, P, and N. When the A element is F, the A element has a concentration of 200 ppm to 2000 ppm. When the A element includes F and at least one of B, P, and N, F has a concentration of 200 ppm to 2000 ppm, and the A element has a total concentration of 200 ppm to 4000 ppm.

The secondary mixture is sintered at a third temperature from 600 degrees Celsius to 1100 degrees Celsius, for a third time period $H_3$ from 5 hours to 20 hours to form the secondary sintered particles. The secondary sintered particles are cooled and milled to form the lithium cobaltate anode material.

Figure 3:
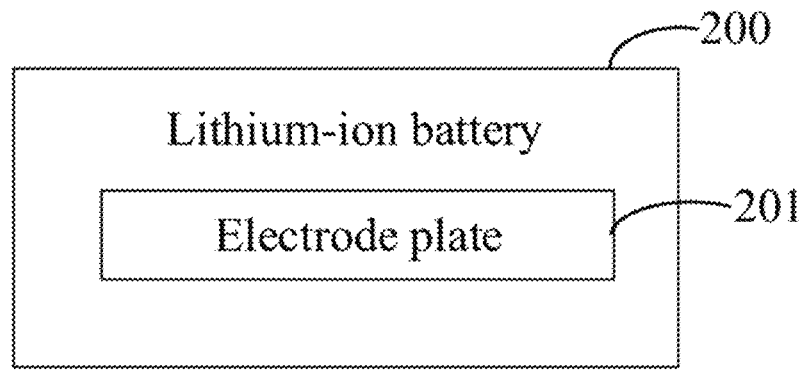
FIG. 3 is a block diagram of an embodiment of a lithium-ion battery including the anode material.
Figure 4:
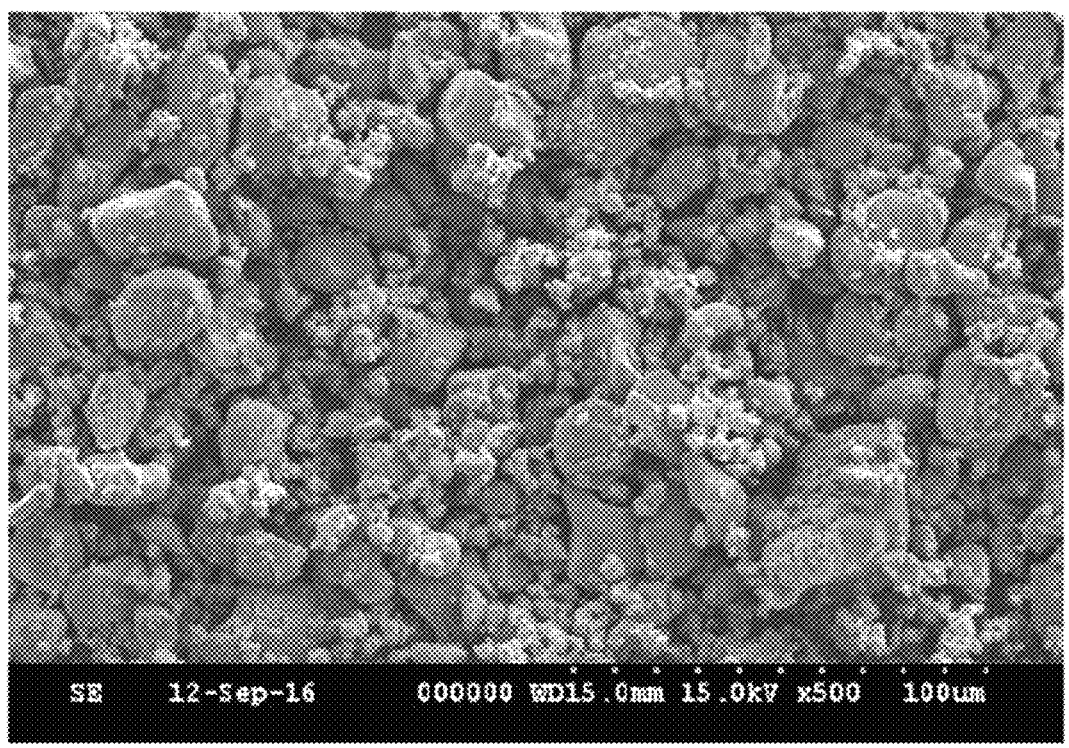
FIG. 4 is a scanning electron micrography (SEM) image of the anode material for lithium-ion battery of Embodiment 1.
Figure 5:
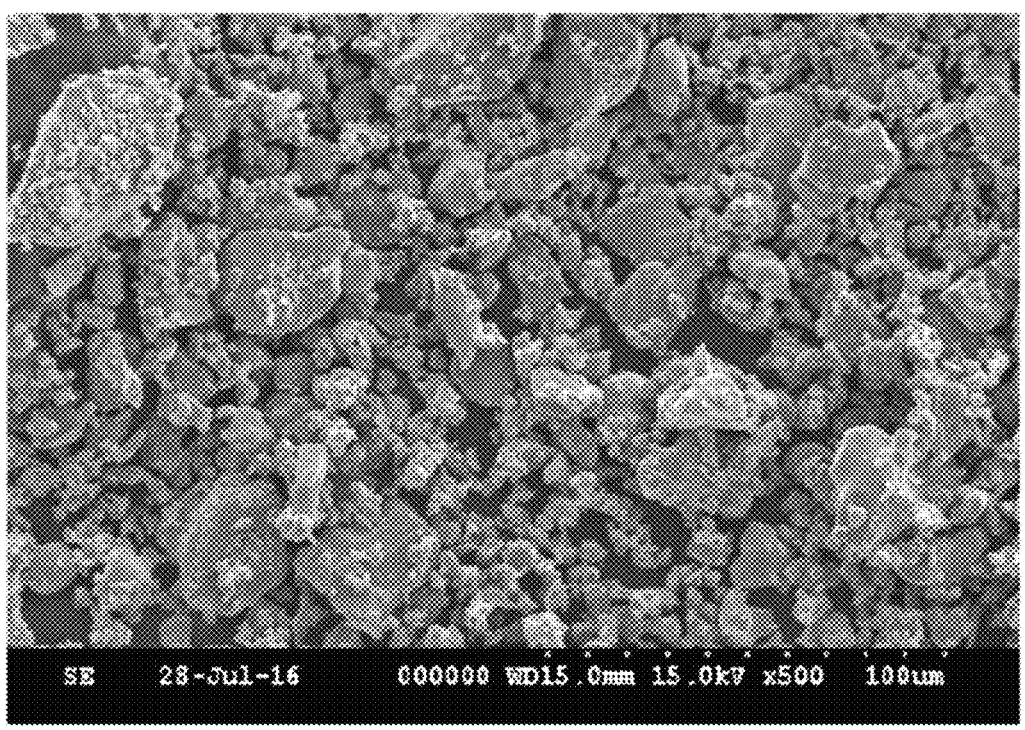
FIG. 5 is an SEM image of the anode material of Embodiment 2.
Figure 6:
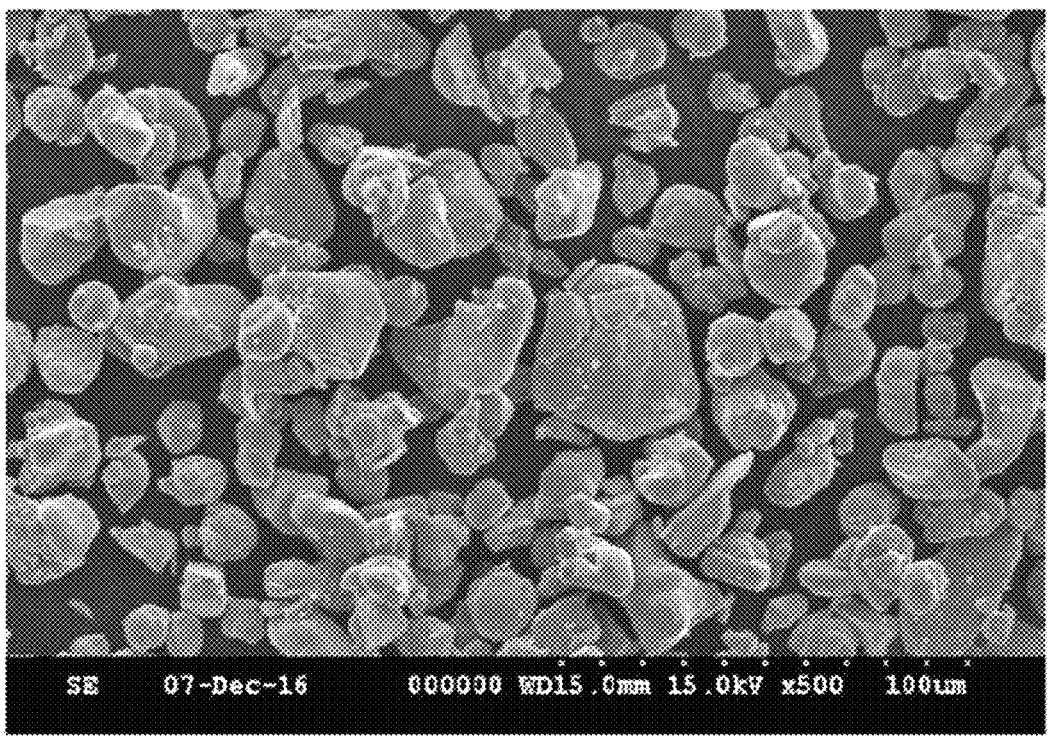
FIG. 6 is an SEM image of the anode material of Embodiment 3.
Figure 7:
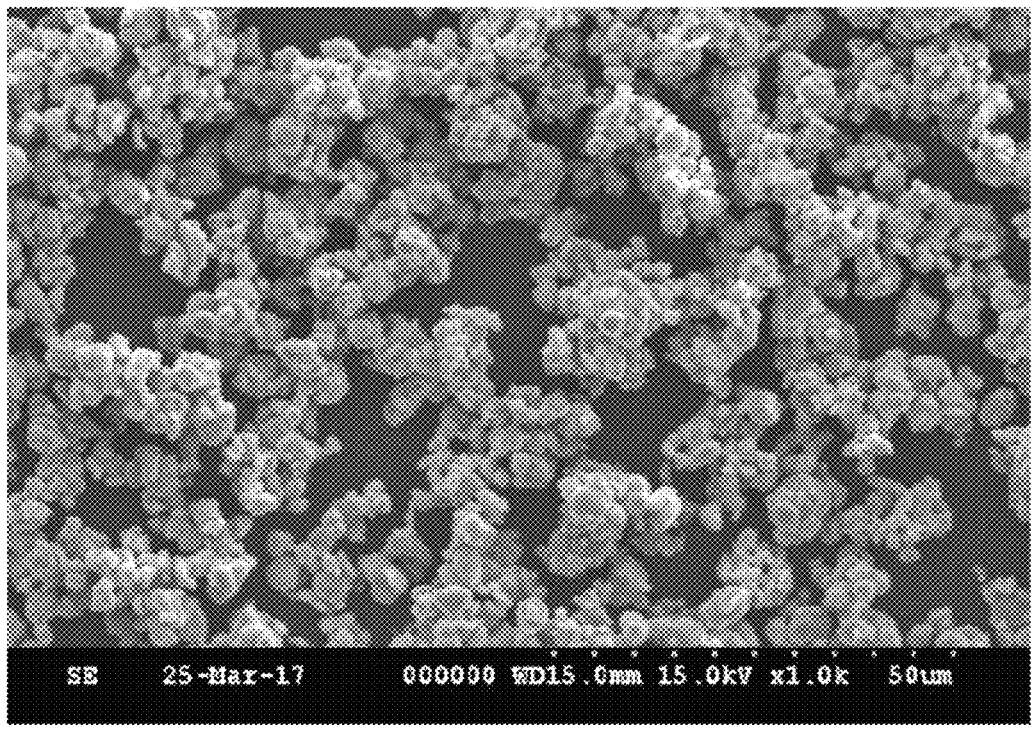
FIG. 7 is an SEM image of the anode material of Embodiment 4.

Referring to FIG. 3, the present disclosure further provides a lithium-ion battery 200. The lithium-ion battery 200 includes an electrode plate 201, a lithium plate (not shown), and an electrolyte (not shown). The electrode plate 201 includes the anode material, a binding agent, and an electrical conductive agent. The lithium-ion battery 200 has a capacity retention ratio greater than 80% after 50 cycles under a voltage of 4.6V.

The anode material has an excellent electrochemical performance, including a high limited charge voltage of 4.45V The lithium-ion battery 200 has a high initial discharge capacity of 193 mAh/g, and a capacity retention ratio greater than 90% after 50 cycles under a high voltage.

Embodiment 1

Cobaltosic oxide doped with Al, lithium carbonate, and magnesium carbonate ($MgCO_3$) were mixed in a ball crusher for 5 hours to form a primary mixture. Li and Co were in a mole ratio of 1.05:1. Mg had a content of 1200 ppm in the primary mixture. The doping amount of Al in the cobaltosic oxide was about 2000 ppm. The cobalt compound particles had a medium diameter of 13 microns to 16 microns. The primary mixture was then loaded to a pushed slab kiln for sintering the primary mixture. The pushed slab kiln was heated to 870 degrees Celsius with a heating rate of 3 degrees Celsius per minute, and maintained at that temperature for 3.5 hours. The pushed slab kiln was then heated to 1050 degrees Celsius at same heating rate, and maintained at that temperature for 6 hours. The primary sintered particles were crushed and separated to obtain lithium cobaltate large intermediate particles (A), which had a medium diameter of 19 microns.

Cobaltosic oxide doped with Mg, lithium carbonate, and titanium dioxide ($TiO_2$) were mixed in a ball crusher for 5 hours to form a primary mixture. Li and Co were in a mole ratio of 1.03:1. Ti had a content of 500 ppm in the primary mixture. The doping amount of Al in the cobaltosic oxide was about 3000 ppm. The cobalt compound particles had particle sizes of 13 microns to 16 microns. The primary mixture was then loaded to a pushed slab kiln for sintering. The pushed slab kiln was heated to 860 degrees Celsius with a heating rate of 3 degrees Celsius per minute, and maintained at that temperature for 3.5 hours. The pushed slab kiln was then heated to 950 degrees Celsius at same heating rate, and maintained at that temperature for 6 hours. The primary sintered particles were crushed and separated to obtain lithium cobaltate small intermediate particles (C), which had a medium diameter of 4 microns.

The particles A and C, in a ratio of 8:2 by weight, were mixed in the ball crusher. $Al_2O_3$, $TiO_2$, and LiF were further added to the ball crusher and mixed for 3 hours to form secondary mixture. Al had a content of 1000 ppm in the secondary mixture. Ti had a content of 700 ppm in the secondary mixture. F had a content of 800 ppm in the secondary mixture.

The secondary mixture was then loaded to the pushed slab kiln for sintering. The pushed slab kiln was heated to 850 degrees Celsius at a heating rate of 5 degrees Celsius per minute, and maintained at the temperature for 6 hours. The secondary sintered particles were cooled and milled to form the lithium cobaltate anode material having a formula of $Li_{1.046}Mg_{0.0063}Al_{0.0094}Ti_{0.0016}CoO_2F_{0.0031}$.

Embodiment 2

Cobaltosic oxide, lithium carbonate, $MgCO_3$, and zirconium oxide ($ZrO_2$) were mixed in a ball crusher for 5 hours to form a primary mixture. Li and Co were in a mole ratio of 1.05:1. Mg had a content of 2200 ppm in the primary mixture. Mg had a content of 500 ppm in the primary mixture. The cobaltosic oxide was not doped with elements other than Co and O. The cobalt compound particles had a medium diameter of 13 microns to 16 microns. The primary mixture was then loaded to a pushed slab kiln for sintering the primary mixture. The pushed slab kiln was heated to 870 degrees Celsius at a heating rate of 3 degrees Celsius per minute, and maintained at the temperature for 3.5 hours. The pushed slab kiln was then heated to 1050 degrees Celsius at the heating rate, and maintained at the temperature for 6 hours. The primary sintered particles were crushed and separated to obtain lithium cobaltate large intermediate particles (B), which had a medium diameter of 19 microns.

The lithium cobaltate small intermediate particles (C) were prepared by the same step in Embodiment 1.

The particles B and C, in a ratio of 8:2 by weight, were mixed in the ball crusher. $Al_2O_3$, $TiO_2$, and LiF were further added to the ball crusher and mixed for 3 hours to form secondary mixture. Al had a content of 1000 ppm in the secondary mixture. Ti had a content of 700 ppm in the secondary mixture. F had a content of 800 ppm in the secondary mixture.

The secondary mixture was sintered, and the secondary sintered particles were cooled and milled by the same step in Embodiment 1. The lithium cobaltate anode material had a formula of $Li_{1.046}Mg_{0.0095}Al_{0.0036}Ti_{0.0016}Zr_{0.0004}CoO_2F_{0.0031}$.

Embodiment 3

The lithium cobaltate large intermediate particles (A) were prepared by the same step as in Embodiment 1.

The particles A, $Al_2O_3$, $TiO_2$, and LiF were added to the ball crusher and mixed for 3 hours to form secondary mixture. Al had a content of 1000 ppm in the secondary mixture. Ti had a content of 700 ppm in the secondary mixture. F had a content of 800 ppm in the secondary mixture.

The secondary mixture was sintered, and the secondary sintered particles were cooled and milled, by the same step as in Embodiment 1. The lithium cobaltate anode material had a formula of $Li_{1.05}Mg_{0.0048}Al_{0.0109}Ti_{0.0014}CoO_2F_{0.0031}$.

Embodiment 4

The lithium cobaltate small intermediate particles (C) were prepared by the same step as in Embodiment 1.

The particles C, $Al_2O_3$, $TiO_2$, and LiF were added to the ball crusher and mixed for 3 hours to form secondary mixture. Al had a content of 1000 ppm in the secondary mixture. Ti had a content of 700 ppm in the secondary mixture. F had a content of 800 ppm in the secondary mixture.

The secondary mixture was sintered, and the secondary sintered particles were cooled and milled by the same step as in Embodiment 1. The lithium cobaltate anode material had a formula of $Li_{1.03}Mg_{0.0121}Al_{0.0036}Ti_{0.0025}CoO_2F_{0.0031}$.

Comparative Embodiment 1

The lithium cobaltate large intermediate particles (A) and the lithium cobaltate small intermediate particles (C) were prepared by the same step as in Embodiment 1.

Differences between the COMPARATIVE EMBODIMENT 1 and the Embodiment 1 are the steps for coating, as follows.

The particles A and C, in a ratio of 8:2 by weight, were mixed in the ball crusher. $Al_2O_3$ and $TiO_2$ were further added to the ball crusher and mixed for 3 hours to form secondary mixture. Al had a content of 1000 ppm in the secondary mixture. Ti had a content of 700 ppm in the secondary mixture. F had a content of 800 ppm in the secondary mixture.

The secondary mixture was sintered, and the secondary sintered particles were cooled and milled, by the same step as in Embodiment 1. The lithium cobaltate anode material had a formula of $Li_{1.046}Mg_{0.0063}Al_{0.0036}Ti_{0.0014}CoO_2$.

Comparative Embodiment 2

The lithium cobaltate large intermediate particles (B) and the lithium cobaltate small intermediate particles (C) were prepared by the same step as in Embodiment 2.

Differences between the Comparative Embodiment 2 and the Embodiment 2 are the steps for coating, as follows.

The particles B and C, in a ratio of 8:2 by weight, were mixed in the ball crusher. $Al_2O_3$ and $TiO_2$ were further added to the ball crusher and mixed for 3 hours to form secondary mixture. Al had a content of 1000 ppm in the secondary mixture. Ti had a content of 700 ppm in the secondary mixture. F had a content of 800 ppm in the secondary mixture.

The secondary mixture was sintered, and the secondary sintered particles were cooled and milled, by the same step as in Embodiment 1. The lithium cobaltate anode material had a formula of $Li_{1.046}Mg_{0.0095}Al_{0.0036}Ti_{0.0016}Zr_{0.0004}CoO_2$.

Comparative Embodiment 3

The lithium cobaltate large intermediate particles (A) and the lithium cobaltate small intermediate particles (C) were prepared by the same step as in Embodiment 1.

Differences between the Comparative Embodiment 3 and the Embodiment 1 are the steps for coating, as follows.

The particles A and C, in a ratio of 8:2 by weight, were mixed in the ball crusher. $TiO_2$ and LiF were further added to the ball crusher and mixed for 3 hours to form secondary mixture. Ti had a content of 700 ppm in the secondary mixture. F had a content of 800 ppm in the secondary mixture.

The secondary mixture was sintered, and the secondary sintered particles were cooled and milled, by the same step as in Embodiment 1. The lithium cobaltate anode material had a formula of $Li_{1.046}Mg_{0.0063}Al_{0.0058}Ti_{0.0016}CoO_2F_{0.0031}$.

Comparative Embodiment 4

The lithium cobaltate large intermediate particles (B) and the lithium cobaltate small intermediate particles (C) were prepared by the same step as in Embodiment 2.

Differences between the Comparative Embodiment 4 and the Embodiment 2 are the steps for coating, as follows.

The particles B and C, in a ratio of 8:2 by weight, were mixed in the ball crusher. $TiO_2$ and LiF were further added to the ball crusher and mixed for 3 hours to form secondary mixture. Ti had a content of 700 ppm in the secondary mixture. F had a content of 800 ppm in the secondary mixture.

The secondary mixture was sintered, and the secondary sintered particles were cooled and milled, by the same step as in Embodiment 1. The lithium cobaltate anode material had a formula of $Li_{1.046}Mg_{0.0095}Ti_{0.006}Zr_{0.0004}CoO_2F_{0.0031}$.

The different lithium cobaltate anode materials prepared by Embodiments 1-4 and Comparative Embodiments 1-4, were tested by inductively coupled plasma (ICP) method and titration method. The results are shown in Table 1.

TABLE 1

| | Content/ppm | | | | |
|---|---|---|---|---|---|
| | Mg | Al | Ti | Zr | F |
| Embodiment 1 | 1600 ± 200 | 2800 ± 300 | 750 ± 100 | / | 500 ± 200 |
| Embodiment 2 | 2400 ± 200 | 1000 ± 300 | 750 ± 100 | 300 ± 100 | 500 ± 200 |
| Embodiment 3 | 1200 ± 200 | 3000 ± 300 | 650 ± 100 | / | 500 ± 200 |
| Embodiment 4 | 3000 ± 200 | 1000 ± 100 | 1200 ± 100 | / | 500 ± 200 |
| Comparative Embodiment 1 | 1600 ± 200 | 2800 ± 300 | 750 ± 100 | / | / |
| Comparative Embodiment 2 | 2400 ± 200 | 1000 ± 300 | 750 ± 100 | 300 ± 100 | / |
| Comparative Embodiment 3 | 1600 ± 200 | 900 ± 200 | 750 ± 100 | / | 500 ± 200 |
| Comparative Embodiment 4 | 2400 ± 200 | / | 750 ± 100 | 300 ± 100 | 500 ± 200 |

Referring to FIGS. 4 to 7, the SEM images show that the particles of the anode material prepared by Embodiments 1 to 4 include primary particles and secondary particles formed by the primary particles.

Figure 8:
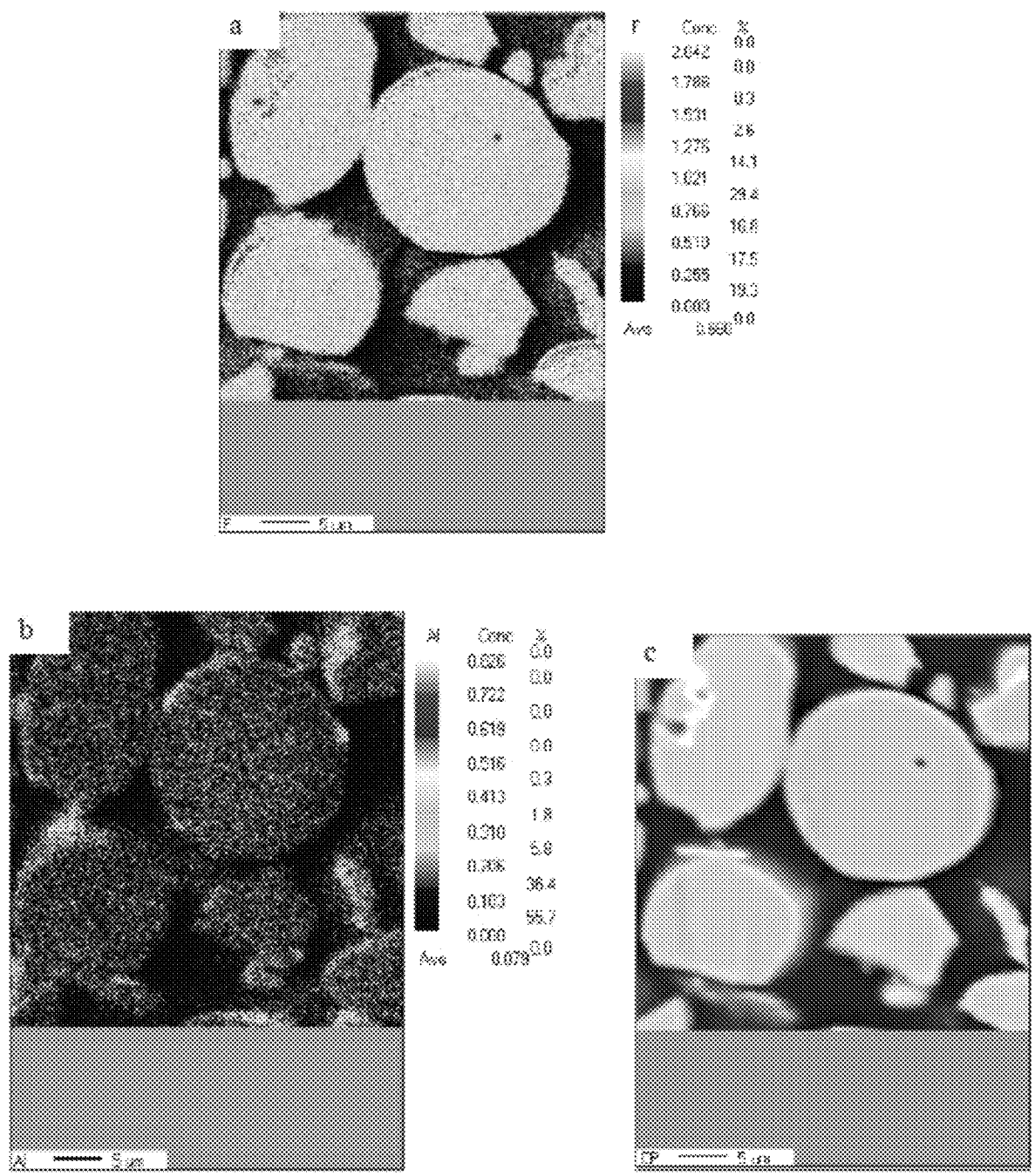
FIG. 8 is a graph illustrating an electron probe microanalysis (EPMA) result of the anode material of Embodiment 3, including content images of fluorine and aluminum in the anode material and COMP image of the anode material.

The lithium cobaltate anode material prepared by Embodiment 3 and Comparative Embodiments 3 and 4 were cut by argon ion and analyzed by EPMA at the cross-sectional area. Referring to FIG. 8, Al and F are enriched in the outer area of the particles of the lithium cobaltate anode material, to form a clear and uniform coating layer (that is, the outer dense layer).

Figure 9:
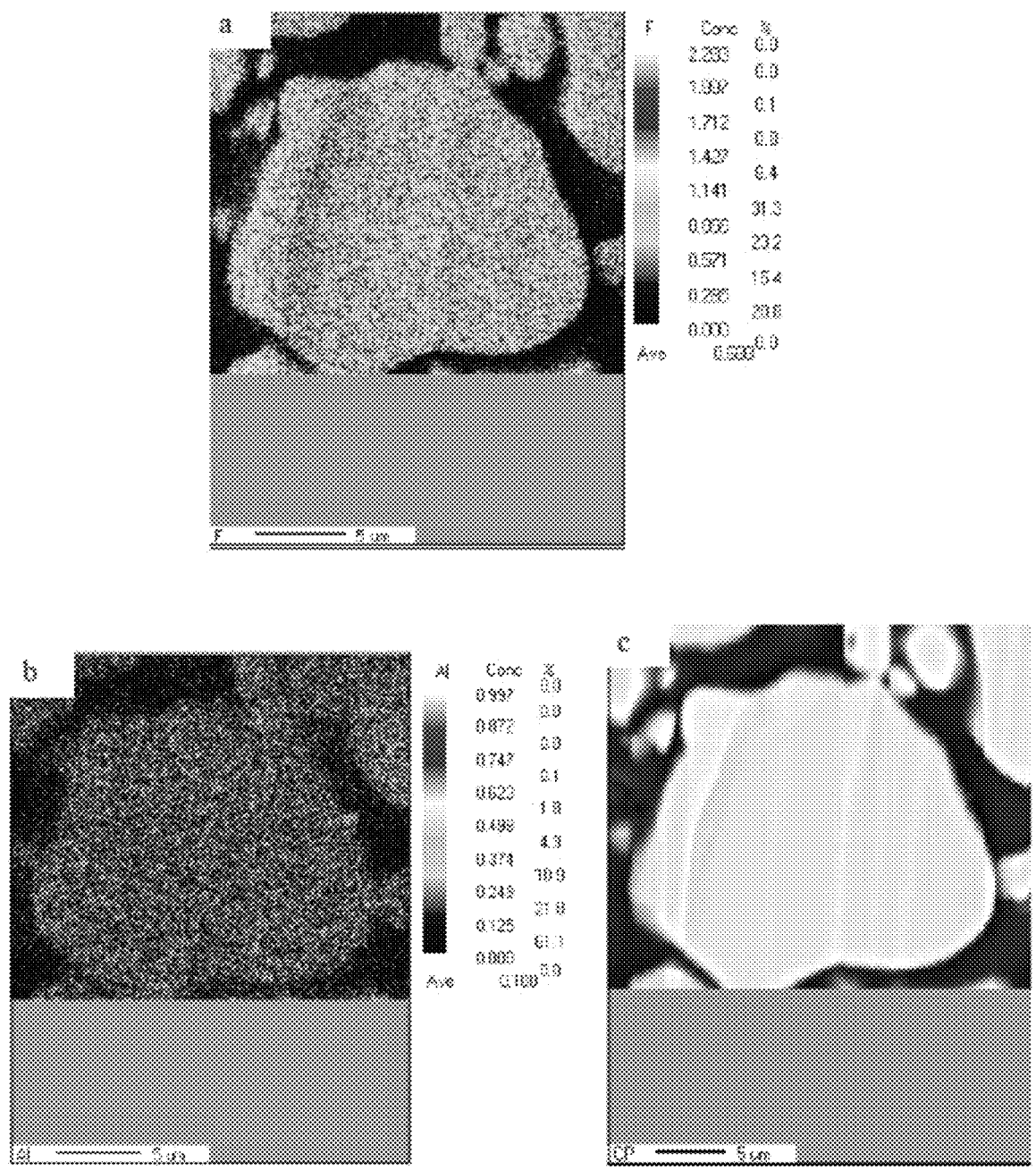
FIG. 9 is a graph illustrating an EPMA result of the anode material of Comparative Embodiment 3, including content images of fluorine and aluminum in the anode material and COMP image of the anode material.
Figure 10:
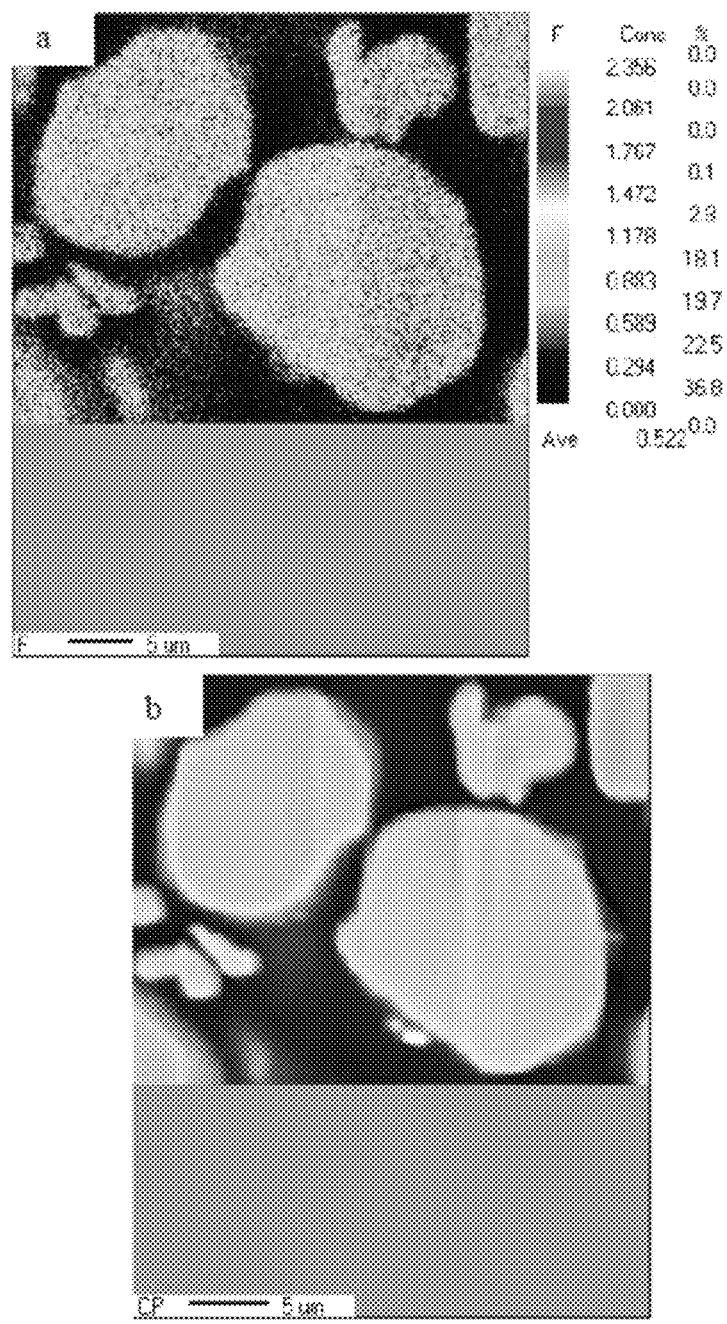
FIG. 10 is a graph illustrating an EPMA result of the anode material of Comparative Embodiment 4, including content image of fluorine in the anode material and COMP image of the anode material.

Referring to FIGS. 9 and 10, although F is evenly distributed, the outer area of the lithium cobaltate anode material to the coating layer were not enriched by F in the absence of Al.

Embodiment 5

Figure 11:
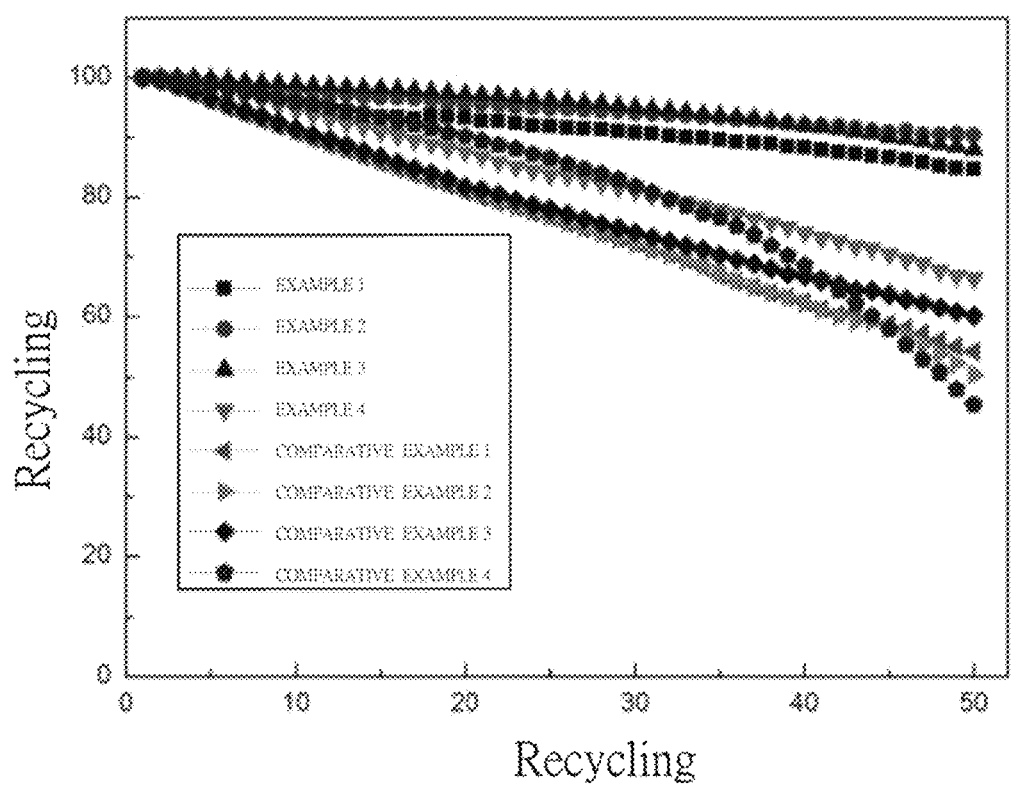
FIG. 11 is a graph illustrating a capacity retention ratio of a lithium-ion battery using the anode material of Embodiment 5.

Each of the lithium cobaltate anode materials prepared by Embodiments 1-4 and Comparative Embodiments 1-4, together with the binding agent and the electrical conductive agent, were used to manufacture an electrode plate. The lithium cobaltate anode material, the binding agent, and the electrical conductive agent were in a ratio of 90:6:4 by weight. Each electrode plate, an isolation membrane, a lithium plate, and an electrolyte were assembled, in an argon-filled glove box, to form a button cell. The cycling performance of each button cell was tested by Shenzhen Xinwei charge discharge test system, at a charge and discharge voltage being 3.0 V-4.5 V and rate performance being 0.1 C/0.1 C. The cycling performance of each button cell was also tested at the charge and discharge voltage being 3.0 V-4.6 V and rate performance being 1 C/1 C. The results are in Table 2 and FIG. 11.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An anode material adapted for a lithium-ion battery, comprising:
   a plurality of particles, each of the plurality of particles comprising an outer dense layer, an inner layer, and a particle core, the inner layer being between the outer dense layer and the particle core, wherein
   the outer dense layer is evenly enriched with an M element and an A element,
   the inner layer comprises the M element and the A element, concentrations of the M element and the A element progressively decreasing in the inner layer along a direction from the outer dense layer to the particle core,
   the particle core comprises the M element and the A element, concentrations of the M element and the A element being greater than zero and evenly distributed in the particle core,

TABLE 2

| | Lithium cobaltate intermediate particles | Content (ppm) | | | Initial charge capacity mAh/g (3.0-4.5 V) 0.1 C/0.1 C | Initial discharge capacity mAh/g (4.5 V-3.0 V) 0.1 C/0.1 C | Initial efficiency % | Capacity retention ratio % after 50 cycles |
|---|---|---|---|---|---|---|---|---|
| | | Al | Ti | F | | | | |
| Embodiment 1 | A80% + C20% | 1000 | 700 | 800 | 198.15 | 191.06 | 96.42 | 84.65 |
| Embodiment 2 | B80% + C20% | 1000 | 700 | 800 | 199.30 | 193.06 | 96.87 | 90.36 |
| Embodiment 3 | A100% | 1000 | 700 | 800 | 198.07 | 189.62 | 95.73 | 87.88 |
| Embodiment 4 | C100% | 1000 | 700 | 800 | 198.34 | 192.87 | 97.24 | 66.32 |
| Comparative Embodiment 1 | A80% + C20% | 1000 | 700 | / | 196.21 | 188.58 | 96.11 | 54.08 |
| Comparative Embodiment 2 | B80% + C20% | 1000 | 700 | / | 199.49 | 192.62 | 96.56 | 50.33 |
| Comparative Embodiment 3 | A80% + C20% | / | 700 | 800 | 199.55 | 190.51 | 95.47 | 60.11 |
| Comparative Embodiment 4 | B80% + C20% | / | 700 | 800 | 197.55 | 192.04 | 97.21 | 45.34 | the M element comprises Al, or Al and at least one of Mg, Ti, Zr, Mn, and Ni, and the A element comprises F, or F and at least one of B, P, and N, wherein the anode material has a general formula of $Li_{1+z}Co_{1-x}MxO_mA_n$, wherein, $0<z\leq0.05$, $0<x\leq0.03$, $1.9\leq m+n\leq2.1$, m and n are not zero.

2. The anode material of claim 1, wherein particle sizes of the plurality of particles of the anode material are uniform or non-uniform, when the plurality of particles has non-uniform particle sizes, a concentration of the M element in the outer dense layer of small particles is higher than that in the outer dense layer of large particles.

3. The anode material of claim 2, wherein the small particles have a medium diameter of 2 microns to 8 microns, and the large particles have a medium diameter of 13 microns to 22 microns.

4. The anode material of claim 1, wherein when the M element is Al, the M element has a concentration of 500 ppm to 12000 ppm; when the A element is F, the A element has a concentration of 200 ppm to 2000 ppm.

5. The anode material of claim 1, wherein when the M element comprises Al and at least one of Mg, Ti, Zr, Mn, and Ni, Al has a concentration of 500 ppm to 12000 ppm, and the M element has a total concentration of 1000 ppm to 30000 ppm; when the A element comprises F and at least one of B, P, and N, F has a concentration of 200 ppm to 2000 ppm, and the A element has a total concentration of 200 ppm to 4000 ppm.

6. An anode material adapted for a lithium-ion battery, comprising:
 a plurality of particles, each of the plurality of particles having an outer dense layer, an inner layer, and a particle core, the inner layer being between the outer dense layer and the particle core, wherein
 the outer dense layer is enriched with an M element and an A element, concentrations of the M element and the A element being progressively decreasing in the outer dense layer and in the inner layer along a direction from the outer dense layer to the particle core,
 the particle core comprises the M element and the A element, concentrations of the M element and the A element being greater than zero and being evenly distributed in the particle core, the plurality of particles of the anode material have a uniform particle size or non-uniform particle sizes, when the plurality of particles have non-uniform particle sizes, a concentration of the M element in the outer dense layer of small particles is higher than that in the outer dense layer of the large particles, and
 the M element comprises Al, or Al and at least one of Mg, Ti, Zr, Mn, and Ni, the A element comprises F, or F and at least one of B, P, and N, wherein the anode material has a general formula of $Li_{1+z}Co_{1-x}MxO_mA_n$, wherein, $0<z\leq0.05$, $0<x\leq0.03$, $1.9\leq m+n\leq2.1$, m and n are not zero.

7. The anode material of claim 6, wherein the small particles have a medium diameter of 2 microns to 8 microns, and the large particles have a medium diameter of 13 microns to 22 microns.

8. The anode material of claim 6, wherein the large particles and the small particles are in a ratio between 7:3 and 9:1 by weight.

9. The anode material of claim 6, wherein when the M element is Al, the M element has a concentration of 500 ppm to 12000 ppm; when the A element is F, the A element has a concentration of 200 ppm to 2000 ppm.

10. The anode material of claim 6, wherein when the M element comprises Al and at least one of Mg, Ti, Zr, Mn, and Ni, Al has a concentration of 500 ppm to 12000 ppm, and the M element has a total concentration of 1000 ppm to 30000 ppm; when the A element comprises F and at least one of B, P, and N, F has a concentration of 200 ppm to 2000 ppm, and the A element has a total concentration of 200 ppm to 4000 ppm.

11. A lithium-ion battery comprising:
 an electrode plate comprising:
  a plurality of particles, each of the plurality of particles having an outer dense layer, an inner layer, and a particle core, the inner layer being between the outer dense layer and the particle core, wherein the outer dense layer is enriched with an M element and an A element, concentrations of the M element and the A element being progressively decreasing in the outer dense layer and in the inner layer along a direction from the outer dense layer to the particle core, the particle core comprises the M element and the A element, concentrations of the M element and the A element being greater than zero and being evenly distributed in the particle core, the plurality of particles of the anode material have a uniform particle size or non-uniform particle sizes, when the plurality of particles have non-uniform particle sizes, a concentration of the M element in the outer dense layer of small particles is higher than that in the outer dense layer of the large particles, and the M element comprises Al, or Al and at least one of Mg, Ti, Zr, Mn, and Ni; the A element comprises F, or F and at least one of B, P, and N, wherein the anode material has a general formula of $Li_{1+z}Co_{1-x}MxO_mA_n$, wherein, $0<z\leq0.05$, $0<x\leq0.03$, $1.9\leq m+n\leq2.1$, m and n are not zero:
 a binding agent; and
 an electrical conductive agent.

12. The lithium-ion battery of claim 11, wherein the lithium-ion battery has a capacity retention ratio greater than 80% after 50 cycles under a voltage of 4.6 V.

* * * * *